United States Patent
Park et al.

(10) Patent No.: US 9,383,844 B2
(45) Date of Patent: Jul. 5, 2016

(54) TOUCH SYSTEM AND CONTROL METHOD THEREOF

(71) Applicant: SILICON WORKS CO., LTD., Daejeon-si (KR)

(72) Inventors: Sun Young Park, Incheon-si (KR); Hyung Seog Oh, Daejeon-si (KR); Jeong In Park, Incheon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 25 days.

(21) Appl. No.: 14/472,491

(22) Filed: Aug. 29, 2014

(65) Prior Publication Data

US 2015/0062040 A1    Mar. 5, 2015

(30) Foreign Application Priority Data

Aug. 30, 2013  (KR) .................. 10-2013-0104264

(51) Int. Cl.
*G06F 3/041* (2006.01)
*G06F 3/044* (2006.01)

(52) U.S. Cl.
CPC ............ *G06F 3/041* (2013.01); *G06F 3/044* (2013.01); *G06F 3/0416* (2013.01)

(58) Field of Classification Search
CPC ....... G06F 3/044; G06F 3/0416; G06F 3/041; G06F 3/0412; G06F 2203/04104
USPC ................. 345/173, 174; 178/18.01, 18.06
See application file for complete search history.

(56) References Cited

U.S. PATENT DOCUMENTS

| 8,395,596 | B2 | 3/2013 | Yang et al. | |
| 2009/0251429 | A1* | 10/2009 | Hung | G06F 3/044 345/173 |
| 2012/0194469 | A1 | 8/2012 | Wang et al. | |
| 2013/0141372 | A1* | 6/2013 | Kang | G06F 3/041 345/173 |
| 2015/0002460 | A1* | 1/2015 | Lee | G06F 3/044 345/174 |
| 2015/0185914 | A1* | 7/2015 | Han | G06F 3/044 345/174 |
| 2015/0268792 | A1* | 9/2015 | Hamaguchi | G06F 3/044 345/174 |

FOREIGN PATENT DOCUMENTS

| KR | 10-2011-0042585 | 4/2011 |
| KR | 10-2011-0121590 | 11/2011 |
| KR | 10-1311096 | 9/2013 |
| KR | 10-1398322 | 5/2014 |

* cited by examiner

*Primary Examiner* — Koosha Sharifi-Tafreshi
(74) *Attorney, Agent, or Firm* — Kile Park Reed & Houtteman PLLC

(57) ABSTRACT

Disclosed are a touch system and a control method thereof. The touch system has a structure in which a plurality of chips correspond to a touchscreen panel having a large screen, wherein the touchscreen panel is divided into areas corresponding to chips and a boundary area between the areas, and each chip performs sensing such that noise is prevented from being generated by a sensing signal of a sensing line of the boundary area.

23 Claims, 12 Drawing Sheets

TOUCH SYSTEM AND CONTROL METHOD THEREOF

BACKGROUND

1. Technical Field

The present disclosure relates to a touch system, and more particularly, to a touch system improved to perform touch recognition by providing a plurality of chips in a touchscreen panel having a large screen.

2. Related Art

A touch system includes a touchscreen panel in which a plurality of driving lines and a plurality of sensing lines are formed. The touch system provides driving signals to the plurality of driving lines and senses touch by using sensing signals of the plurality of sensing lines, which correspond to the driving signals. The number of the driving lines and the number of the sensing lines may be changed according to the size and resolution of the touchscreen panel.

The touch system has been applied to various applications including smart phones, and is demanded to be applied to an application having a large screen. In order to satisfy such a demand, the touch system may be configured to divide the touchscreen panel having a large screen into two areas and to use two chips that perform sensing in each area. In most cases, the touch system is designed to differentially amplify the sensing signals of the sensing lines in consideration of a noise problem and the like.

However, in the case of simultaneously driving and sensing the aforementioned divided areas by using two chips that perform the differential amplification, inter-chip interference may occur in a boundary area, and a problem may occur in data processing for a sensing signal of the boundary area due to noise by the inter-chip interference.

SUMMARY

Various embodiments are directed to provide a touch system capable of driving and sensing a touchscreen panel having a large screen by using two or more chips, and a control method thereof.

Furthermore, various embodiments are directed to provide a touch system capable of avoiding inter-chip interference by a sensing signal of a sensing line of a boundary area when respective chips sense corresponding divided areas and facilitating data processing for the sensing signal of the sensing line of the boundary area, and a control method thereof.

Furthermore, various embodiments are directed to provide a touch system capable of facilitating data processing for a sensing signal of a sensing line in a boundary area between divided areas of a touchscreen panel and sharing roles of chips for driving and sensing the touchscreen panel, and a control method thereof Furthermore, various embodiments are directed to provide a touch system including a pad for forming a channel corresponding to a sensing line positioned in a boundary area between divided areas of a touchscreen panel, and capable of ensuring flexibility corresponding to the case in which a switch for the pad is difficult to be provided in a chip.

In an embodiment, a touch system includes: a plurality of chips connected to sensing lines of areas of a touchscreen panel, the areas including a plurality of areas and a boundary area among the plurality of areas, wherein the plurality of chips corresponding to adjacent areas share the sensing line of the boundary area among the adjacent areas, and differentially amplify sensing signals of the adjacent sensing lines included in the areas, which correspond to the plurality of chips, and the boundary area adjacent to the areas.

In an embodiment, a touch system includes: a pad unit including a plurality of pads for receiving sensing signals of sensing lines included in a plurality of areas and a boundary area among the plurality of areas of a touchscreen panel, the pads receiving the sensing signal of the sensing line of the boundary area and sharing the sensing signal with the pads of another chip; a differential amplification circuit that has a first input terminal and a second input terminal and includes a plurality of differential amplifiers that differentially amplify the sensing signals that are input to the first input terminal and the second input terminal; and a switching circuit that matches three pads, which receive sensing signals of sensing lines in even sequences and sensing signals of sensing lines adjacent to both sides of the sensing lines in even sequences for one direction of the touchscreen panel, to each differential amplifier for switching, selectively connects a first pad and a second pad, which receive the sensing signals of the sensing lines in even sequences and sensing signals of sensing lines adjacent to one side of the sensing lines in even sequences, to the first input terminal, and selectively connects the second pad and a third pad, which receive the sensing signals of the sensing lines in even sequences and sensing signals of sensing lines adjacent to the other side of the sensing lines in even sequences.

In an embodiment, a control method of a touch system includes: providing, by a driving block of a first chip of a plurality of chips corresponding to a touchscreen panel, a driving signal for first sensing and second sensing to each driving line; selecting, by sensing blocks of the plurality of chips, sensing signals of sensing lines in even sequences and sensing signals corresponding to sensing lines adjacent to one side of the sensing lines in even sequences among sensing lines arranged in one direction, which are included in areas corresponding to the sensing blocks and a boundary area adjacent to the areas, in response to the driving signal for the first sensing and outputting a first differential amplification signal having an odd phase; and selecting, by the sensing blocks of the plurality of chips, the sensing signals of the sensing lines in even sequences and sensing signals corresponding to sensing lines adjacent to the other side of the sensing lines in even sequences, which are included in the areas corresponding to the sensing blocks and the boundary area adjacent to the areas, in response to the driving signal for the second sensing and outputting a second differential amplification signal having an even phase According to the present invention, it is possible to drive and sense divided areas of a touchscreen panel having a large screen by using two or more chips, to avoid inter-chip interference by a sensing signal of a sensing line of a boundary area when respective chips sense corresponding divided areas, and to remove noise due to the inter-chip interference to facilitate data processing for the sensing signal of the sensing line of the boundary area.

Furthermore, according to the present invention, it is possible to facilitate data processing for the sensing signal of the sensing line of the boundary area between the divided areas of the touchscreen panel having a large screen by using two or more chips, and to share roles of chips such as touch recognition by driving or sensing of the touchscreen panel, thereby reducing burden of the chips.

Furthermore, according to the present invention, it is possible to provide a chip, which provides a channel corresponding to the sensing line positioned in the boundary area between the divided areas of the touchscreen panel having a large screen, in a chip, and to ensure flexibility for a switch configuration, thereby providing a switch for the pad in the chip.

DETAILED DESCRIPTION

Figure 1:
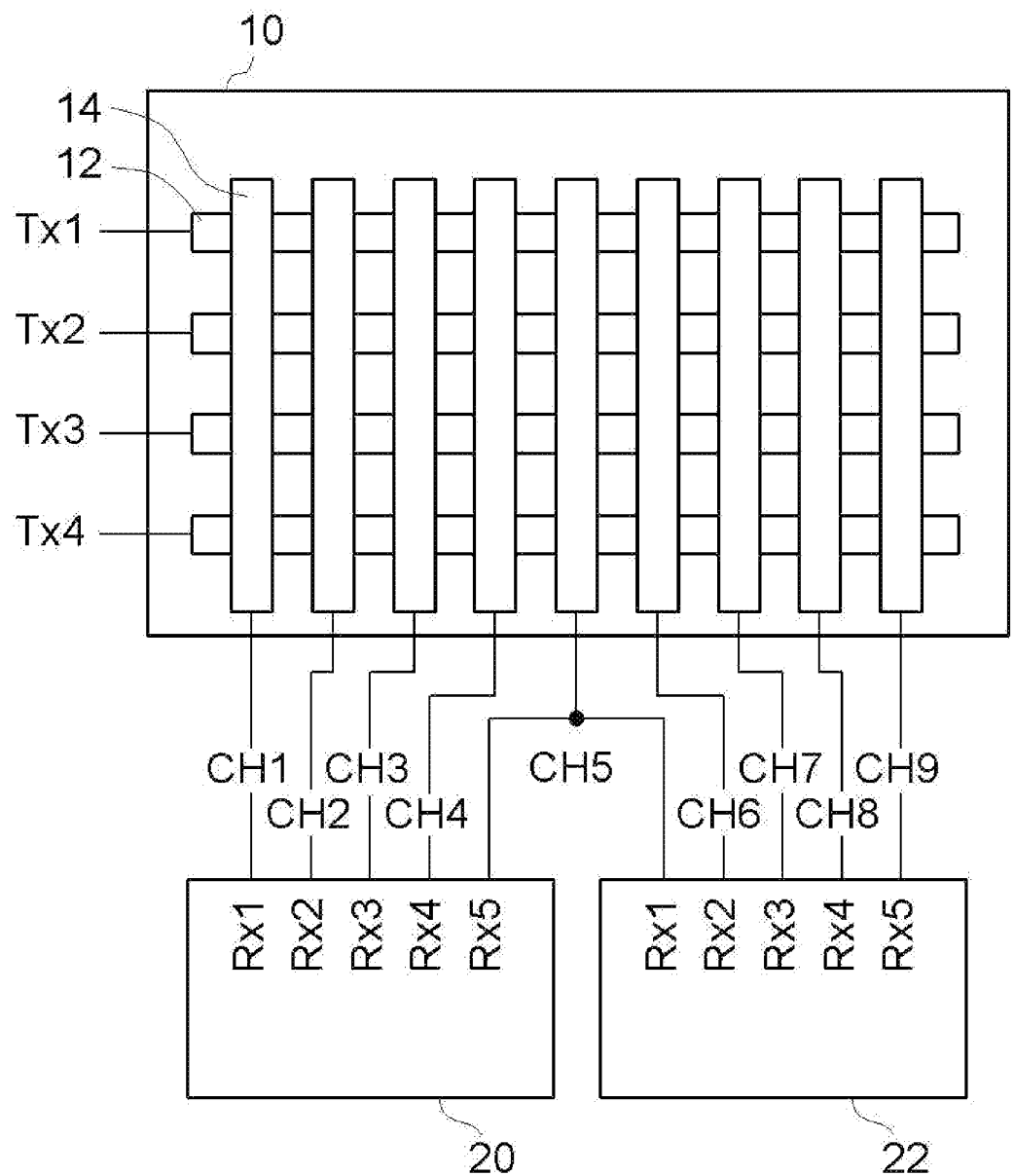
FIG. 1 is a block diagram illustrating an embodiment of a touch system of the present invention.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

The present invention may be implemented to have two or more chips in order to drive and sense a touchscreen panel, wherein each chip is configured to differentially amplify sensing signals and sense touch.

Referring to FIG. 1, a touchscreen panel 10 includes driving lines 12 and sensing lines 14 formed therein, wherein the driving lines 12 and the sensing lines 14 are configured to form coupling capacitors. In the touchscreen panel 10, for example, the sensing lines 14 arranged in one direction and the driving lines 12 arranged to cross the sensing lines 14 may be formed. The coupling capacitors may be formed at crossing points at which the driving lines 12 and the sensing lines 14 cross each other. The embodiment of FIG. 1 illustrates that the touchscreen panel 10 includes nine sensing lines 14 and four driving lines 12 formed therein. However, since this is only for explaining the embodiment of the present invention, the present invention is not limited thereto, and the number of the sensing lines 14 and the number of the driving lines 12 may be variously changed according to the size and resolution of the touchscreen panel 10 having a large screen.

The embodiment of the touchscreen panel 10 of FIG. 1 illustrates that the nine sensing lines 14 output sensing signals CH1 to CH9, respectively, and driving signals Tx1, Tx2, Tx3, and Tx4 are provided to the four driving lines 12, respectively. In this case, the driving signals Tx1, Tx2, Tx3, and Tx4 may be sequentially applied to the corresponding driving lines 12 with a time difference. In another example, the driving signals Tx1, Tx2, Tx3, and Tx4 may be simultaneously applied, partially simultaneously applied, or partially sequentially applied.

Capacitors (not illustrated) are formed at positions at which the driving lines 12 and the sensing lines 14 of the touchscreen panel 10 cross each other. When touch is generated, since capacitance changes at the position at which the touch has been generated, a current corresponding to the change in the capacitance may be output from a sensing line as a sensing signal.

In a frame area of the touchscreen panel 10 having a large screen, the sensing lines 14 for outputting the four sensing signals CH1 to CH4 may be set as an area corresponding to a chip 20, and the sensing lines 14 for outputting the four sensing signals CH6 to CH9 may be set as an area corresponding to a chip 22. An area including the sensing line 14 for outputting the sensing signal CH5 may be defined as a boundary area.

As described above, the touchscreen panel 10 is divided into two about the boundary area including the sensing line 14 for outputting the sensing signal CH5.

Each of the chips 20 and 22 includes a plurality of pads for connections to the sensing lines 14. FIG. 1 illustrates that each of the chips 20 and 22 includes five pads for connections to the sensing lines 14. In the case of the chip 20, four pads Rx1, Rx2, Rx3, and Rx4 are provided to receive the sensing signals CH1 to CH4 of the sensing lines 14 included in an area assigned to the chip 20 between the divided areas of the touchscreen panel 10, and the other one pad Rx5 is provided to receive the sensing signal CH5 of the sensing line 14 of the boundary area shared between the chips 20 and 22. In the case of the chip 22, four pads Rx2, Rx3, Rx4, and Rx5 are provided to receive the sensing signals CH6 to CH9 of the sensing lines 14 included in an area assigned to the chip 22 between the divided areas of the touchscreen panel 10, and the other one pad Rx1 is provided to receive the sensing signal CH5 of the sensing line 14 of the boundary area shared between the chips 20 and 22.

Figure 2:
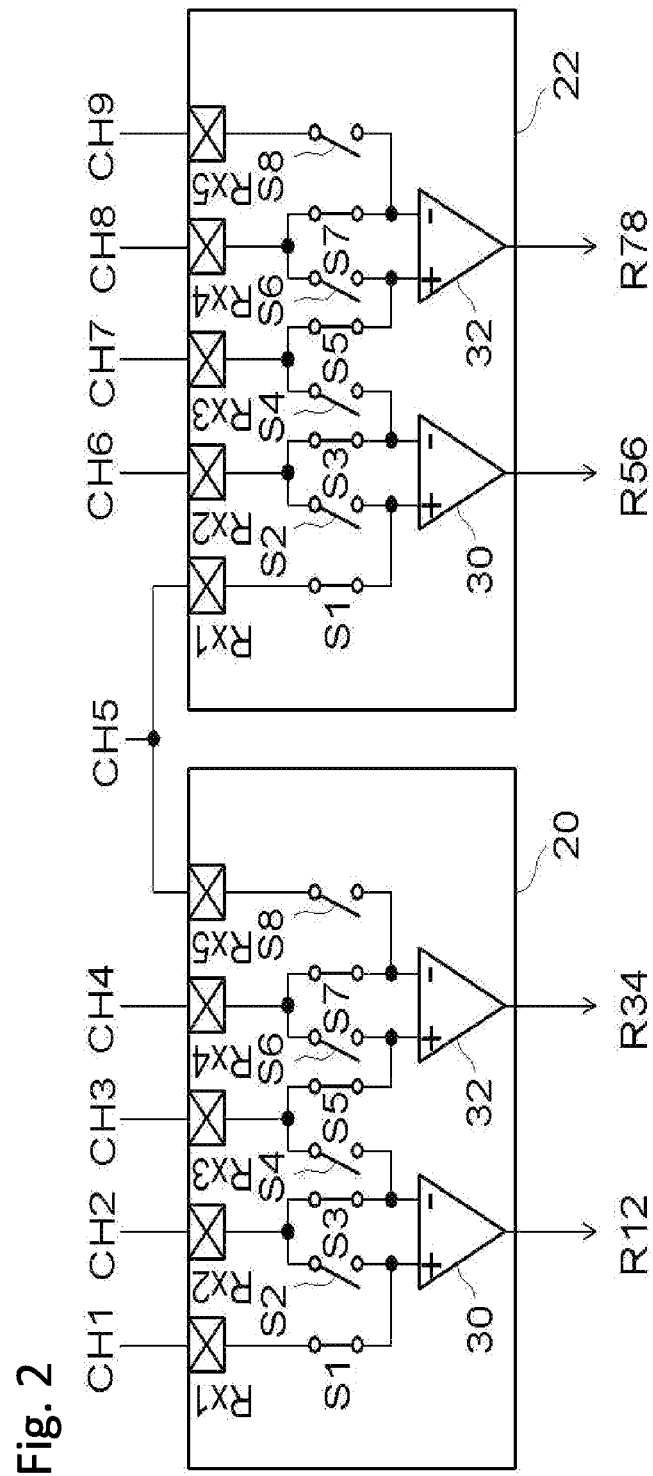
FIG. 2 is a circuit diagram illustrating an example of an internal switching structure of each chip of FIG. 1 and illustrating a switching state by first sensing.

Internal routing structures of the chips 20 and 22 of FIG. 1 will be described with reference to FIG. 2 and FIG. 3. FIG. 2 illustrates a switching state corresponding to first sensing and FIG. 3 illustrates a switching state corresponding to second sensing.

Figure 3:
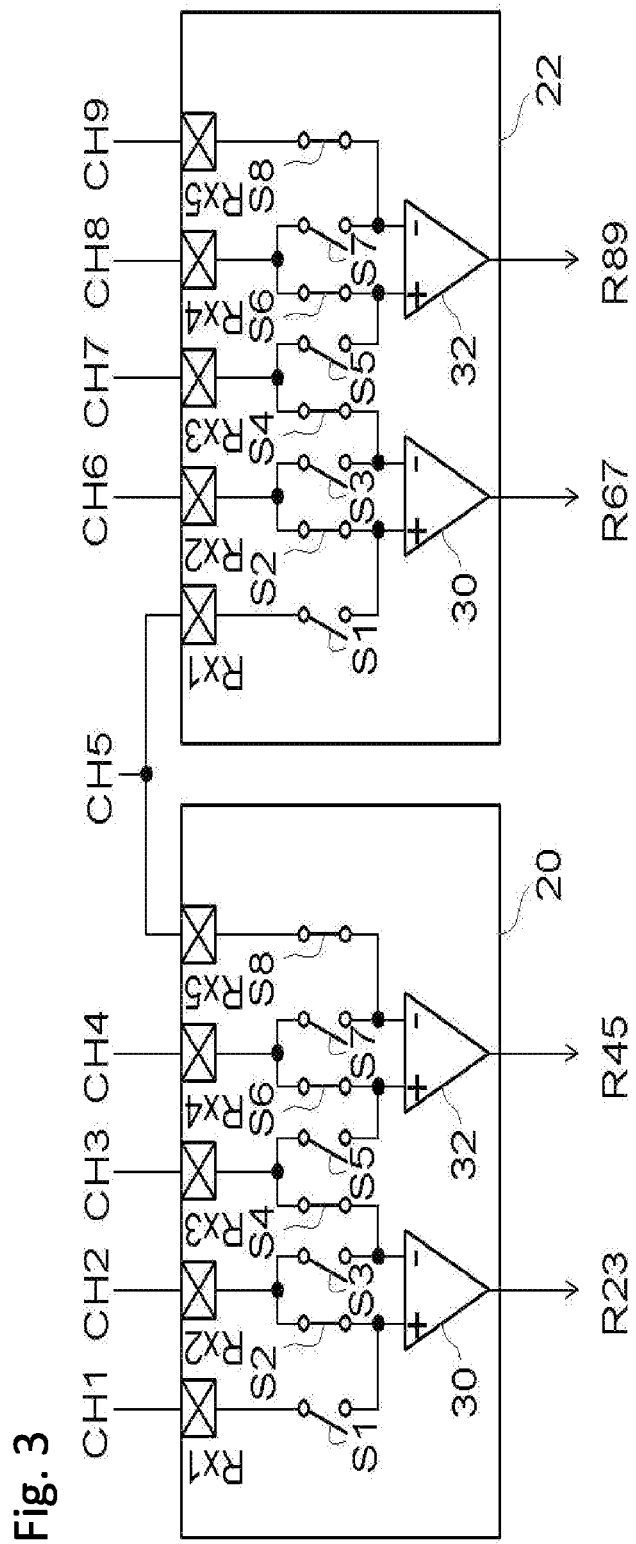
FIG. 3 is a circuit diagram illustrating a switching state by second sensing an example of FIG. 2.

In FIG. 1 to FIG. 3, the chips 20 and 22 corresponding to areas adjacent to each other may include pads for connections to the sensing line 14 of the boundary area, and the sensing line of the boundary area may be connected to each pad of the chips 20 and 22 corresponding to areas adjacent to each other so as to provide the sensing signal CH5 through interconnections branched from an exterior of the chips 20 and 22.

In the embodiment of the present invention, first sensing of FIG. 2 and second sensing of FIG. 3 are performed for each driving line, and the first sensing and the second sensing differentially amplify sensing signals of different pairs adjacent to each other. The first sensing may be defined to perform an operation for differentially sensing the sensing signals of sensing lines in even sequences and sensing signals of sensing lines adjacent to one side of the sensing lines in even sequences for one direction of the touchscreen panel, and the second sensing may be defined to perform an operation for differentially sensing the sensing signals of the sensing lines in even sequences and sensing signals of sensing lines adjacent to the other side of the sensing lines in even sequences for one direction of the touchscreen panel. The first sensing and the second sensing will be described in more detail later.

In order to perform the first sensing and the second sensing, the chips 20 and 22 include a differential amplification circuit and a switching circuit, respectively.

The differential amplification circuit of each of the chips 20 and 22 includes a plurality of differential amplifiers, wherein each differential amplifier has a first input terminal with positive polarity and a second input terminal with negative polarity and differentially amplifies sensing signals that are input to the first input terminal and the second input terminal. In the embodiment, the differential amplification circuit of each of the chips 20 and 22 includes two differential amplifiers 30 and 32, and the first input terminal and the second input terminal of each of the differential amplifiers 30 and 32 are indicated by "+" and "−", respectively.

The switching circuits of the chips 20 and 22 are configured to match three pads, which receive the sensing signals of the sensing lines in even sequences and sensing signals of sensing lines adjacent to both sides of the sensing lines in even sequences for one direction of the touchscreen panel 10, to each differential amplifier, and to perform switching. The switching of the switching circuits of the chips 20 and 22 are performed to selectively connect two pads, which receive the sensing signals of sensing lines in even sequences and the sensing signals of the sensing lines adjacent to one side of the sensing lines in even sequences, to the first input terminal of the differential amplifier, and to selectively connect two pads, which receive the sensing signals of the sensing lines in even sequences and the sensing signals of the sensing lines adjacent to the other side of the sensing lines in even sequences, to the second input terminal of the differential amplifier.

To this end, the switching circuit includes switches between the two pads, which receive the sensing signals of sensing lines in even sequences and the sensing signals of the sensing lines adjacent to one side of the sensing lines in even sequences, and the first input terminal of the differential amplifier, and switches between the two pads, which receive the sensing signals of the sensing lines in even sequences and the sensing signals of the sensing lines adjacent to the other side of the sensing lines in even sequences, and the second input terminal of the differential amplifier.

The configuration of the chip 20 will be described in detail with reference to FIG. 2 and FIG. 3.

The chip 20 includes the two differential amplifiers 30 and 32 included in the differential amplification circuit, and eight switches S1 to S8 included in the switching circuit.

One side of the switch S1 and one side of the switch S2 are connected to the first input terminal (+) of the differential amplifier 30 in parallel to each other, and one side of the switch S3 and one side of the switch S4 are connected to the second input terminal (−) of the differential amplifier 30 in parallel to each other. The other side of the switch S1 is connected to the pad Rx1 that receives the sensing signal CH1, the other side of the switch S2 and the other side of the switch S3 are commonly connected to the pad Rx2 that receives the sensing signal CH2, and the other side of the switch S4 is connected to the pad Rx3 that receives the sensing signal CH3.

Furthermore, one side of the switch S5 and one side of the switch S6 are connected to the first input terminal (+) of the differential amplifier 32 in parallel to each other, and one side of the switch S7 and one side of the switch S8 are connected to the second input terminal (−) of the differential amplifier 32 in parallel to each other. The other side of the switch S5 is connected to the pad Rx3 that receives the sensing signal CH3, the other side of the switch S6 and the other side of the switch S7 are commonly connected to the pad Rx4 that receives the sensing signal CH4, and the other side of the switch S8 is connected to the pad Rx5 that receives the sensing signal CH5. In this case, the switches S1, S3, S5, and S7 and the switches S2, S4, S6, and S8 are switched in contrary to each other. The switch S8 is provided to receive the sensing signal of the sensing line 14 of the boundary area for the purpose of the differential amplification of the chip 20, or to set a connection state between the sensing line 14 that outputs the sensing signal CH5 and the second input terminal of the differential amplifier 32 of the chip 20 as a floating state for the purpose of the differential amplification of the chip 22.

Also, the chip 22 includes the two differential amplifiers 30 and 32 included in the differential amplification circuit, and eight switches S1 to S8 included in the switching circuit. Since the switching structure using the eight switches S1 to S8 of the switching circuit of the chip 22 between the two differential amplifiers 30 and 32 and the pads Rx1, Rx2, Rx3, Rx4, and Rx5 is equal to the case of the chip 20, a detailed description thereof will be omitted in order to avoid redundancy. However, the pad Rx1 of the chip 22 is provided to receive the sensing signal CH5 of the sensing line 14 of the boundary area, and the switch S1 is provided to receive the sensing signal of the sensing line 14 of the boundary area for the purpose of the differential amplification of the chip 22, or to set a connection state between the sensing line 14 that outputs the sensing signal CH5 and the first input terminal of the differential amplifier 30 of the chip 22 as a floating state for the purpose of the differential amplification of the chip 20.

As described above, the embodiment of FIG. 1 to FIG. 3 is configured. Accordingly, in the switching circuits of the chips 20 and 22, the switches S1, S3, S5, and S7 are turned on and the switches S2, S4, S6, and S8 are turned off in response to the first sensing. Furthermore, in the switching circuits of the chips 20 and 22, the switches S1, S3, S5, and S7 are turned off and the switches S2, S4, S6, and S8 are turned on in response to the second sensing.

In the case of the first sensing, the differential amplifier 30 of the chip 20 differentially amplifies the sensing signal CH1 transferred through the turned-on switch S1 and the sensing signal CH2 transferred through the turned-on switch S3, and outputs a differential sensing signal R12. The differential amplifier 32 of the chip 20 differentially amplifies the sensing signal CH3 transferred through the turned-on switch S5 and the sensing signal CH4 transferred through the turned-on switch S7, and outputs a differential sensing signal R34. The differential amplifier 30 of the chip 22 differentially amplifies the sensing signal CH5 transferred through the turned-on switch S1 and the sensing signal CH6 transferred through the turned-on switch S3, and outputs a differential sensing signal R56. The differential amplifier 32 of the chip 22 differentially amplifies the sensing signal CH7 transferred through the turned-on switch S5 and the sensing signal CH8 transferred through the turned-on switch S7, and outputs a differential sensing signal R78.

The aforementioned first sensing performs an operation for differentially sensing the sensing signals of the sensing lines 14 in even sequences ($2^{nd}$, $4^{th}$, $6^{th}$, and $8^{th}$) and the sensing signals of the sensing lines adjacent to one side ($1^{st}$, $3^{rd}$, $5^{th}$, and $7^{th}$) of the sensing lines in even sequences for one direction of the touchscreen panel. The first sensing may be defined to output the differentially amplified differential sensing signals R12, R34, R56, and R78 having odd phases for pairs in odd sequences among the sensing lines 14 of the touchscreen panel.

In the case of the second sensing, the differential amplifier 30 of the chip 20 differentially amplifies the sensing signal CH2 transferred through the turned-on switch S2 and the sensing signal CH3 transferred through the turned-on switch S4, and outputs a differential sensing signal R23. The differential amplifier 32 of the chip 20 differentially amplifies the sensing signal CH4 transferred through the turned-on switch S6 and the sensing signal CH5 transferred through the turned-on switch S8, and outputs a differential sensing signal R45. The differential amplifier 30 of the chip 22 differentially amplifies the sensing signal CH6 transferred through the turned-on switch S2 and the sensing signal CH7 transferred through the turned-on switch S4, and outputs a differential sensing signal R67. The differential amplifier 32 of the chip 22 differentially amplifies the sensing signal CH8 transferred through the turned-on switch S6 and the sensing signal CH9 transferred through the turned-on switch S8, and outputs a differential sensing signal R89.

The aforementioned second sensing performs an operation for differentially sensing the sensing signals of sensing lines 14 in even sequences ($2^{nd}$, $4^{th}$, $6^{th}$, and $8^{th}$) and the sensing signals of the sensing lines adjacent to one side ($3^{rd}$, $5^{th}$, $7^{th}$, and $9^{th}$) of the sensing lines in even sequences for one direction of the touchscreen panel. The second sensing may be defined to output the differentially amplified differential sensing signals R23, R45, R67, and R89 having even phases for pairs in even sequences among the sensing lines 14 of the touchscreen panel.

The aforementioned first sensing and second sensing are performed to output the sensing signals having phases different from each other with respect to the driving lines 12 arranged to cross the sensing lines 14.

Between the chips 20 and 22, the chip 20 uses the sensing signal CH5 of the sensing line 14 of the boundary area in response to the second sensing, and the chip 22 uses the sensing signal CH5 of the sensing line 14 of the boundary area in response to the first sensing.

According to the embodiment of FIG. 1 to FIG. 3 of the present invention, the first sensing of FIG. 2 and the second sensing of FIG. 3 are performed for the driving lines 12, thereby sequentially obtaining the differential sensing signals having phases different from each other. That is, in the embodiment of FIG. 1 to FIG. 3, the differential sensing signals R12 and R34 having odd phases for the area assigned to the chip 20 and the boundary area and the differential sensing signals R56 and R78 having odd phases for the area assigned to the chip 22 are simultaneously output by the first sensing. Then, in the embodiment of FIG. 1 to FIG. 3, the differential sensing signals R23 and R45 having even phases for the area assigned to the chip 20 and the differential sensing signals R67 and R89 having even phases for the area assigned to the chip 22 are simultaneously output by the second sensing. When the first sensing and the second sensing of the embodiment of FIG. 1 to FIG. 3 are sequentially performed for all the driving lines 12, it is possible to obtain differential sensing signals for all frames of the touchscreen panel 10 according to the embodiment of the present invention.

Figure 4:
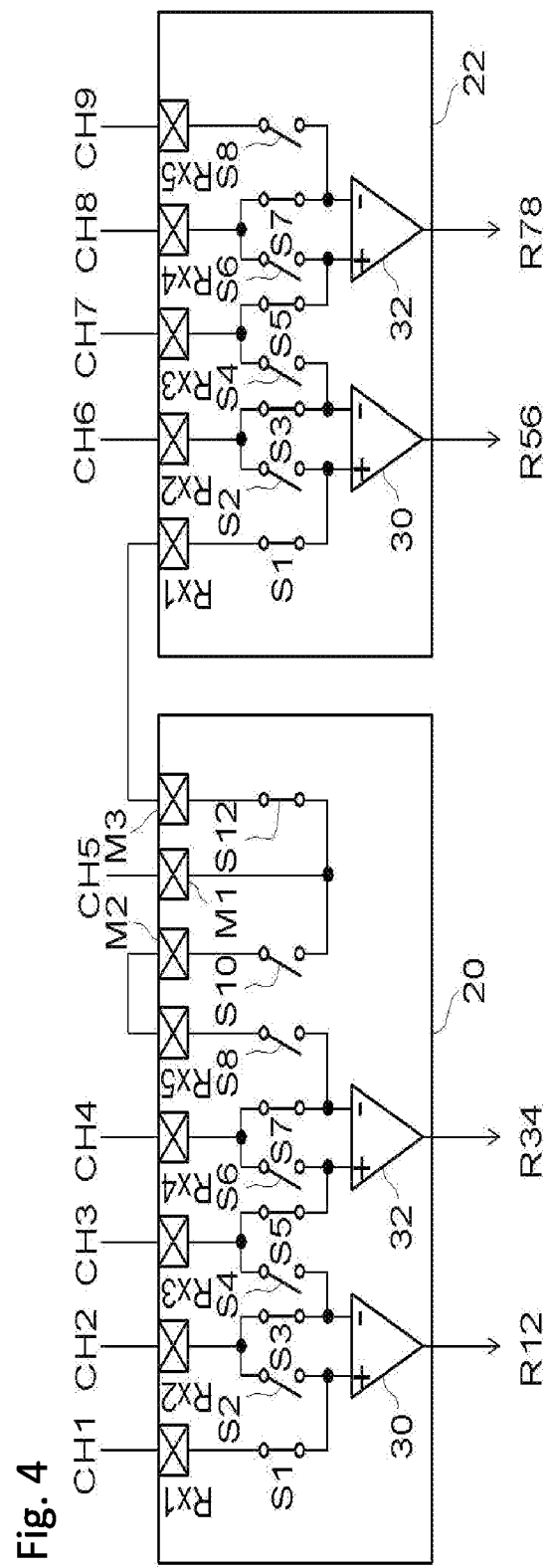
FIG. 4 is a circuit diagram illustrating another example of an internal switching structure of each chip of FIG. 1 and illustrating a switching state by first sensing.
Figure 5:
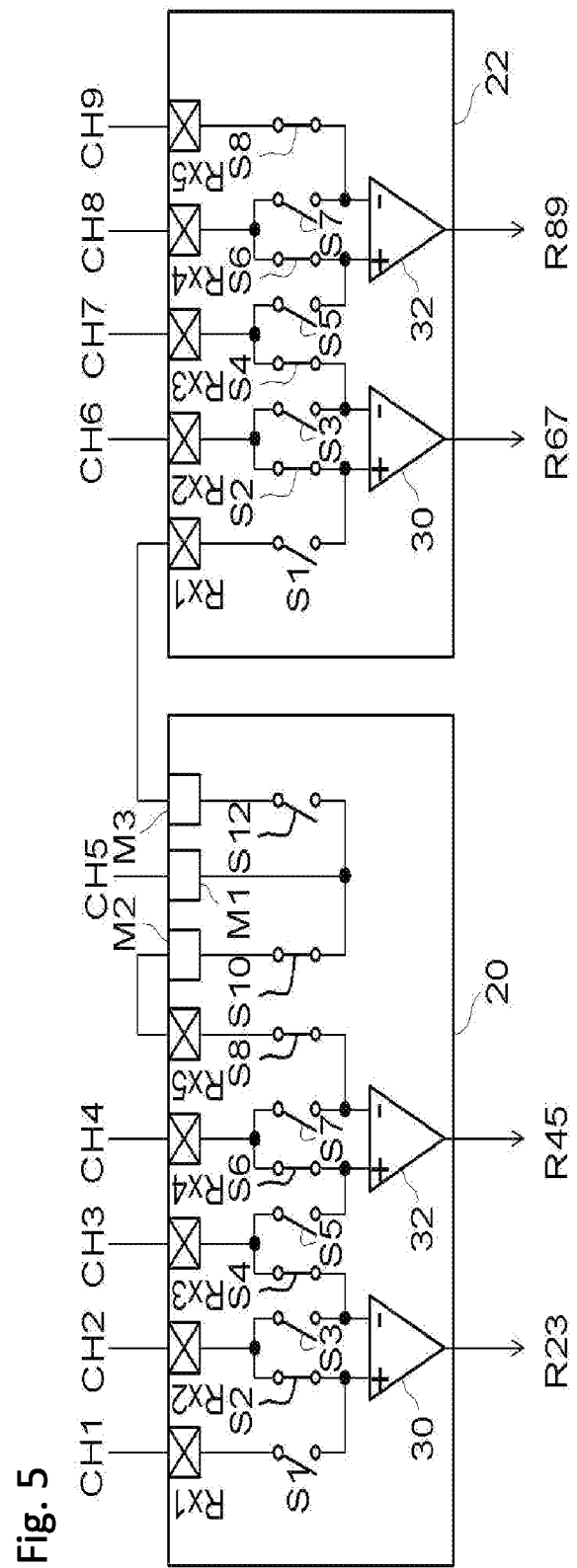
FIG. 5 is a circuit diagram illustrating a switching state by second sensing another example of FIG. 4.

According to an embodiment of the present invention, the chips 20 and 22 may be configured as illustrated in FIG. 4 and FIG. 5.

In chips used in order to drive the touchscreen panel having a large screen, pads for connections to sensing lines for forming channels for the purpose of sensing are designed. However, in the chips, it may be difficult to provide a switch, which is connected to the sensing line for the boundary area of the touchscreen panel, in the chips in terms of design. In this regard, since it is necessary to ensure flexibility for solving such a problem, the embodiment of FIG. 4 and FIG. 5 may be applied.

In the embodiment of FIG. 4 and FIG. 5, the chip 20 further includes a connection pad M1, two output pads M2 and M3, and switches S10 and S12 as compared with the embodiment of FIG. 2 and FIG. 3.

In the chip 20, the connection pad M1 is provided for a connection to the sensing line of the boundary area, and the two output pads M2 and M3 are provided to output the sensing signal CH5 of the sensing line of the boundary area. For the routing of the sensing signal, the pad Rx5 of the chip 20 and the output pad M2 of the chip 20 are electrically connected to each other through an interconnection provided at an exterior of the chip, and the output pad M3 of the chip 20 and the pad Rx1 of the chip 22 are electrically connected to each other through an interconnection provided at an exterior of the chip.

In the chip 20, the switches S10 and S12 are configured to switch the transfer of the sensing signal CH5 of the sensing line of the boundary area to the two output pads M2 and M3 in a contrary manner. In the embodiment of FIG. 4 and FIG. 5, the switches S10 and S12 are integrated in the chip 20; however, the present invention is not limited thereto, and the switches S10 and S12 may be provided as analog switches outside the chip 20.

By the aforementioned configuration, selective routing for the chips 20 and 22 of the sensing signal CH5 of the sensing line of the boundary area may be performed in response to the first sensing and the second sensing.

In the embodiment of FIG. 4 of the present invention, in response to the first sensing, the switches S1, S3, S5, S7, and S12 of the chip 20 are turned on and the switches S1, S3, S5, and S7 of the chip 22 are turned on. Thus, the sensing signal CH5 of the sensing line of the boundary area is routed to the first input terminal (+) of the differential amplifier 30 in the chip 20 via the connection pad M1, the turned-on switch S12, and the output pad M3 in the chip 20, and the pad Rx1 and the switch S1 in the chip 22. Routing of the sensing signal CH5 of the sensing line of the boundary area to the second input terminal (−) of the differential amplifier 32 in the chip 20 is blocked by turn-off of the switch S10.

In the embodiment of FIG. 4, by the aforementioned first sensing, the sensing signals of the sensing lines in even sequences (2, 4, 6, and 8) and the sensing signals of the sensing lines 14 adjacent to one side (1, 3, 5, and 7) of the sensing lines in even sequences for one direction of the touchscreen panel are differentially amplified, so that differentially amplified differential sensing signals R12, R34, R56, and R78 having odd phases for pairs in odd sequences among the sensing lines 14 of the touchscreen panel are output from the differential amplifiers 30 and 32 of the chips 20 and 22, respectively.

Then, in the embodiment of FIG. 5 of the present invention, in response to the second sensing, the switches S2, S4, S6, S8, and S10 of the chip 20 are turned on and the switches S2, S4, S6, and S8 of the chip 22 are turned on. Thus, the sensing signal CH5 of the sensing line of the boundary area is routed to the second input terminal (−) of the differential amplifier 32 via the connection pad M1, the turned-on switch S10, the output pad M3, the pad Rx5, and the turned-on switch S8 in the chip 20. Routing of the sensing signal CH5 of the sensing line of the boundary area to the first input terminal (+) of the differential amplifier 30 in the chip 22 is blocked by turn-off of the switch S12.

In the embodiment of FIG. 5, by the aforementioned second sensing, the sensing signals of the sensing lines in even sequences (2, 4, 6, and 8) and the sensing signals of the sensing lines 14 adjacent to the other side (1, 3, 5, and 7) of the sensing lines in even sequences for one direction of the touchscreen panel are differentially amplified, so that differentially amplified differential sensing signals R23, R45, R67, and R89 having even phases for pairs in even sequences among the sensing lines 14 of the touchscreen panel are output from the differential amplifiers 30 and 32 of the chips 20 and 22, respectively.

The switching circuit and the differential amplification circuit illustrated in FIG. 2 and FIG. 3 and the switching circuit and the differential amplification circuit illustrated in FIG. 4 and FIG. 5 of the present invention may be included in a sensing block of each of the chips 20 and 22. With reference FIG. 6, a detailed configuration of an embodiment of the present invention will be described.

Figure 6:
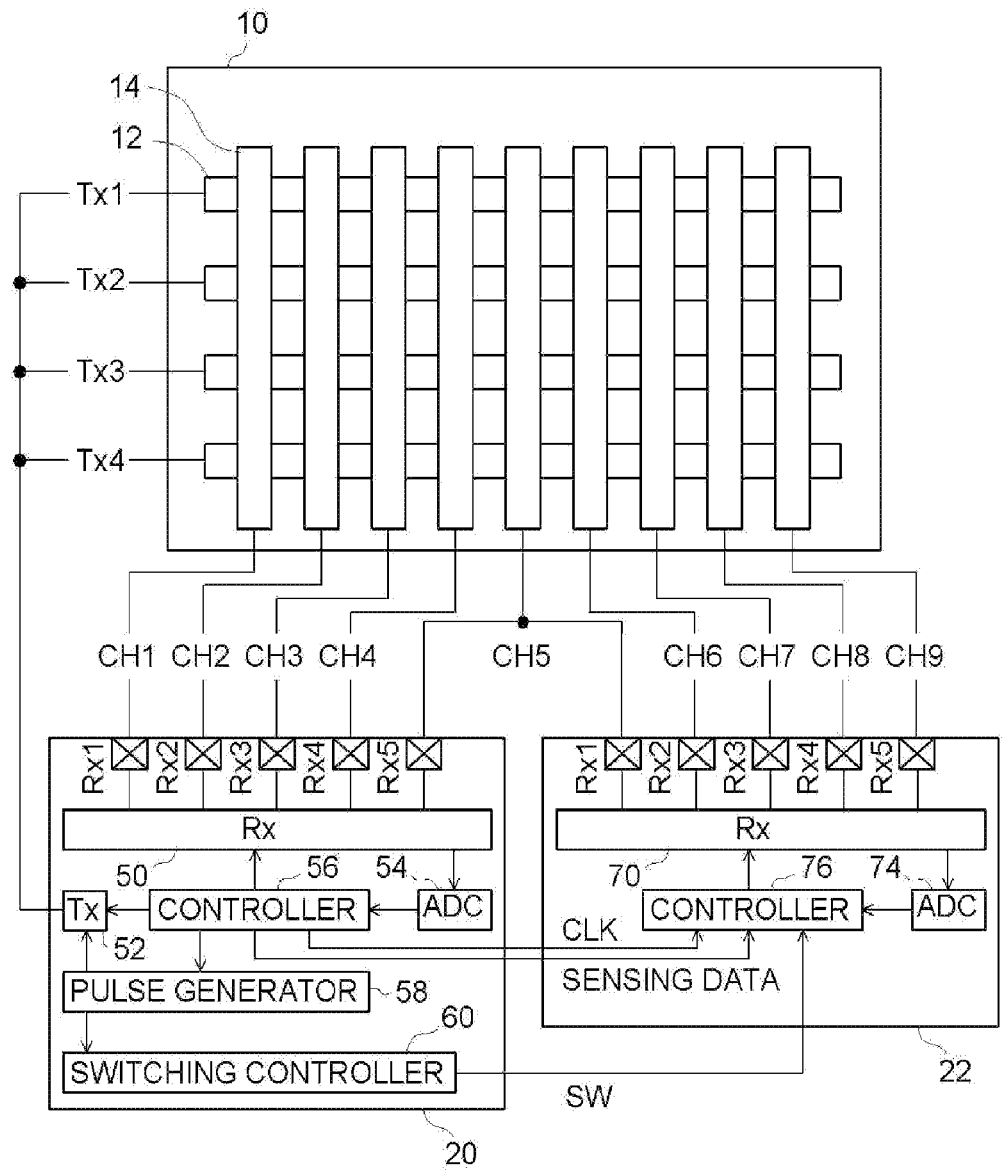
FIG. 6 is a detailed block diagram of an embodiment of FIG. 1.

As illustrated in FIG. 6, the chip 20 may include a sensing block 50, a driving block 52, an analog to digital converter 54, a controller 56, a pulse generator 58, and a switching controller 60, and the chip 22 may include a sensing block 70, an analog to digital converter 74, and a controller 76.

The sensing blocks 50 and 70 of the chips 20 and 22 may include the switching circuit and the differential amplification circuit illustrated in FIG. 2 and FIG. 3 and the switching circuit and the differential amplification circuit illustrated in FIG. 4 and FIG. 5, respectively, and output differential sensing signals according to the first sensing and the second sensing.

The analog to digital converters 54 and 74 of the chips 20 and 22 convert the differential sensing signals output from the sensing blocks 50 and 70, and output sensing data of a digital format.

The controllers 56 and 76 of the chips 20 and 22 control the switching of the sensing blocks 50 and 70 for the purpose of the first sensing in which the sensing signals of the sensing lines in even sequences and the sensing signals of the sensing lines adjacent one side of the sensing lines in even sequences are differentially amplified, and the second sensing in which the sensing signals of the sensing lines in even sequences and the sensing signals of the sensing lines adjacent to the other side of the sensing lines in even sequences are differentially amplified, and receive the sensing data output from the analog to digital converters 54 and 74, respectively.

Figure 7:
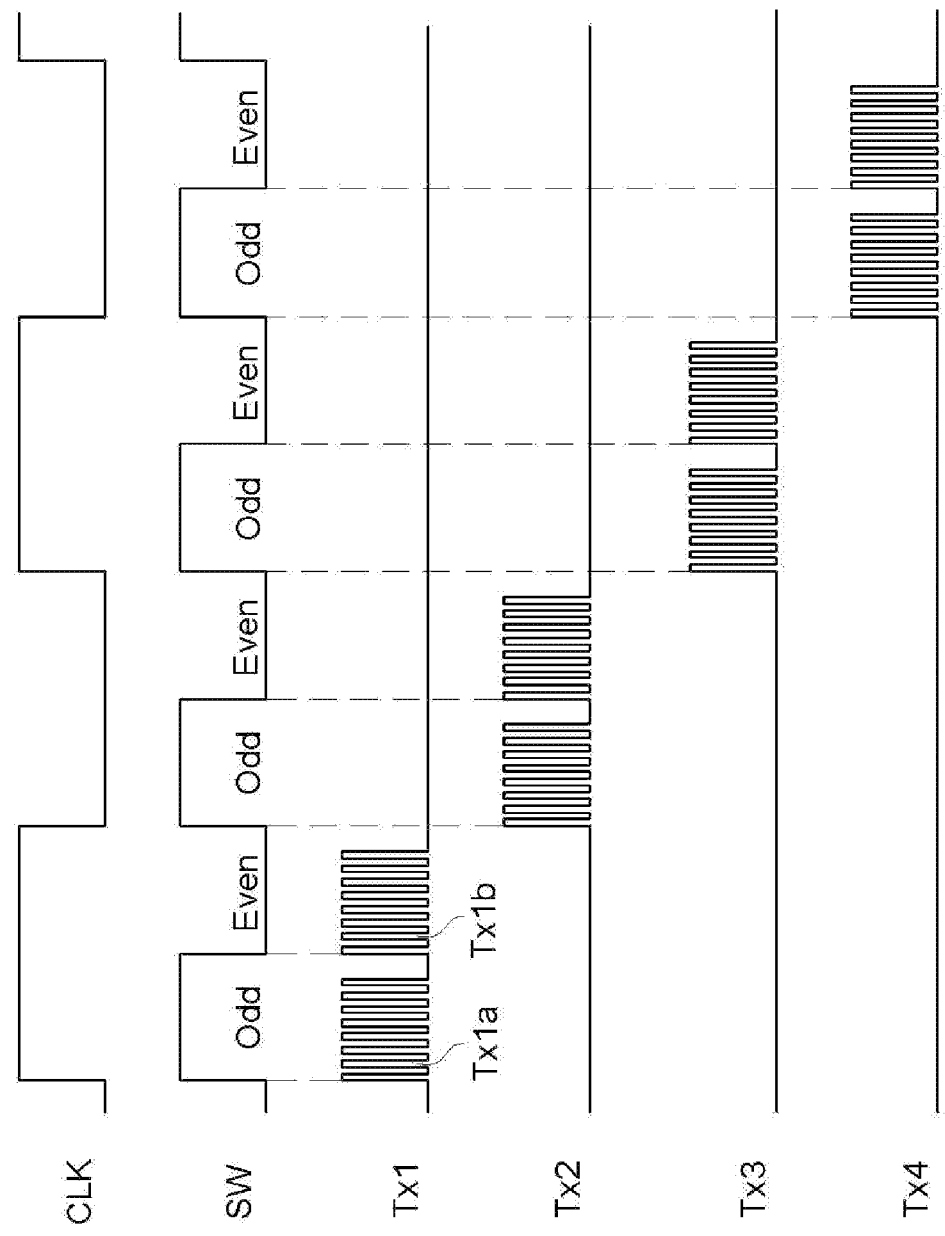
FIG. 7 is a timing diagram for explaining an operation of an embodiment of FIG. 6.

The driving block 52 of the chip 20 provides the driving signals Tx1, Tx2, Tx3, and Tx4 to the driving lines 12 of the touchscreen panel 10, the output of the driving signals Tx1, Tx2, Tx3, and Tx4 may be controlled by the controller 56, and the driving signals Tx1, Tx2, Tx3, and Tx4 may be generated by a pulse provided by the pulse generator 58. The driving block 52 provides sequential driving pulses for the first sensing and the second sensing to the driving lines 12 as illustrated in FIG. 7. Each of the driving signals Tx1, Tx2, Tx3, and Tx4 includes first driving pulses and second driving pulses corresponding to the first sensing. For example, the driving signal Tx1 includes first driving pulses Tx1$a$ and second driving pulses Tx1$b$.

The pulse generator 58 of the chip 20 generates a pulse by a clock CLK of FIG. 7 provided by the controller 56, and provides the pulse to the driving block 52.

Figure 8:
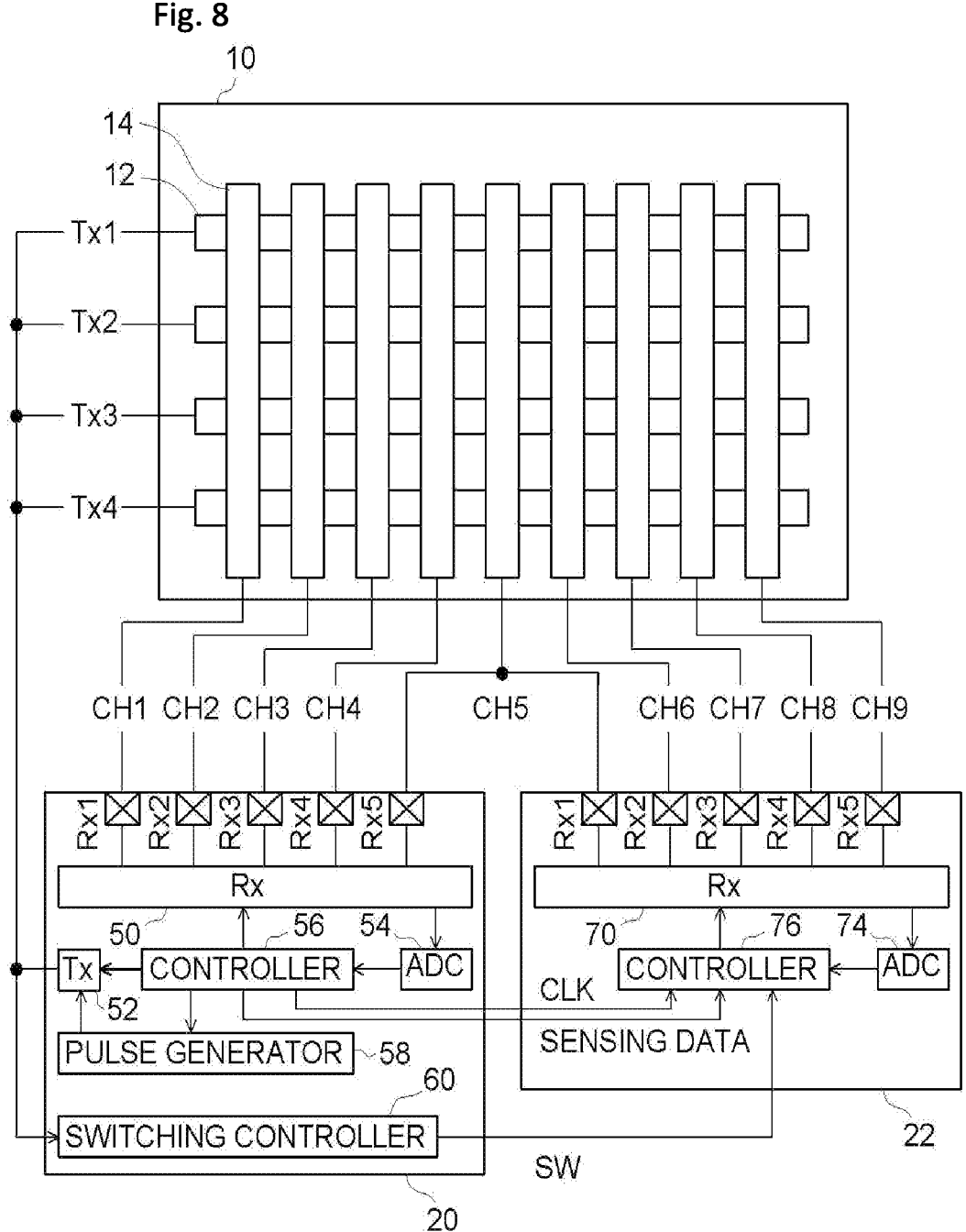
FIG. 8 is a block diagram illustrating a modified embodiment of FIG. 6.

The switching controller 60 of the chip 20 may generate a switching control signal SW for the switching of the sensing block 70 of the other chip 22 in synchronization with any one of the driving signals Tx1, Tx2, Tx3, and Tx4 output from the driving block 52 and the pulse output from the pulse generator 58. An embodiment of FIG. 8 illustrates that the switching controller 60 of the chip 20 generates the switching control signal SW for the switching of the sensing block 70 of the other chip 22 in synchronization with the driving signals Tx1, Tx2, Tx3, and Tx4 output from the driving block 52, and the embodiment of FIG. 6 illustrates that the switching controller 60 of the chip 20 generates the switching control signal SW for the switching of the sensing block 70 of the other chip 22 in synchronization with the pulse output from the pulse generator 58. The switching control signal SW may be generated such that the rising edge of the switching control signal SW is synchronized with the start points of the first driving pulses Tx1$a$ of the driving signal and the falling edge of the switching control signal SW is synchronized with the start points of the second driving pulses Tx1$b$ of the driving signal.

The switching controller 60 provides the switching control signal SW to the controller 76 of the other chip 22, so that the first sensing and the second sensing of the all the chips 20 and 22 may be synchronized with each other. In FIG. 7, a period for the first sensing is indicated by "Odd" and a period for the second sensing is indicated by "Even".

The controller 56 of the chip 20 and the controller 76 of the chip 22 may share a control signal such as the clock CLK for the purpose of the synchronization of the sensing operation. That is, the controller 56 may provide the clock CLK to the controller 76 for the purpose of the synchronization. The driving signal may be provided by the half cycle of the clock CLK, and driving is performed for one driving line during the half cycle of the clock. Preferably, one cycle of the aforementioned switching control signal and one cycle of the clock are set to coincide with each other.

Figure 9:
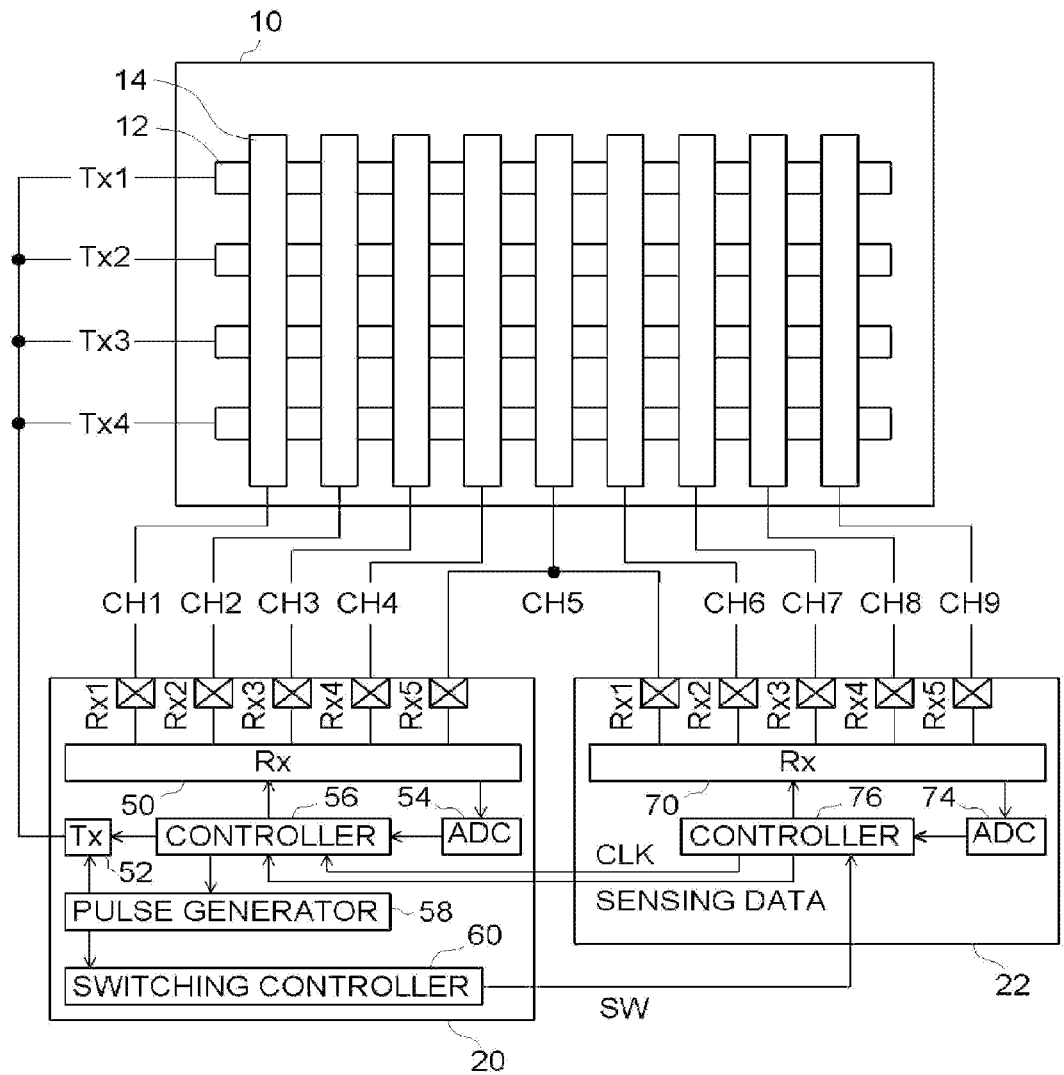
FIG. 9 is a block diagram illustrating another modified embodiment of FIG. 6.

Furthermore, in the embodiment of the present invention, as illustrated in FIG. 6, the controller 56 of the chip 20 may be configured to transfer the sensing data to the controller 76 of the chip 22, and the controller 76 of the chip 22 may be configured to perform a process for touch recognition. Differently from this, in the embodiment of the present invention, as illustrated in FIG. 9, the controller 76 of the chip 22 may be configured to transfer the sensing data to the controller 56 of the chip 20, and the controller 56 of the chip 20 may be configured to perform a process for touch recognition.

In the case of FIG. 6, the controller 56 of the chip 20 may take charge of a process for driving the touchscreen panel 10, and the controller 76 of the chip 22 may take charge of a process for collecting the sensing data and deriving a coordinate value of touch through the touch recognition. That is, the embodiment of FIG. 6 illustrates a structure in which the controllers 56 and 76 of the chips 20 and 22 share a function. Differently from this, in the case of FIG. 9, the controller 56 of the chip 20 may take charge of the process for driving the touchscreen panel 10 and the process for collecting the sensing data and deriving a coordinate value of touch through the touch recognition. That is, the embodiment of FIG. 9 illustrates a structure in which only the controller 56 of the chip 20 performs the main process.

As described above, the embodiments may be implemented, and in the embodiments according to the present invention, the driving may be performed as illustrated in FIG. 7, and the first sensing and the second sensing may be performed for each driving line in response to the driving of FIG. 7. The operations of the embodiments of the present invention will be described with reference to the configurations of FIG. 2 to FIG. 4.

Under the control of the controller 56 of the chip 20, the driving block 52 sequentially provides the first driving line with the first driving pulses Tx1$a$ for the first sensing and the second driving pulses Tx1$b$ for the second sensing. The driving signal Tx1 corresponding to the first driving line includes the first driving pulses Tx1*a* and the second driving pulses Tx1*b*, and each of the driving signals Tx2, Tx3, and Tx4 corresponding to each driving line includes the first driving pulses Tx1*a* and the second driving pulses Tx1*b*.

At the time point at which the first driving pulses Tx1*a* are provided to the first driving line, the sensing block 50 of the chip 20 enters a state for the first sensing by the controller 56, so that the switching states of the switches S1 to S8 are controlled as illustrated in FIG. 2, and the sensing block 70 of the chip 22 also enters a state for the first sensing by the controller 76, so that the switching states of the switches S1 to S8 are controlled as illustrated in FIG. 2. The switches S1 to S8 of the sensing blocks 50 and 70 are switched to the states as illustrated in FIG. 2, so that the differential amplifiers 30 and 32 of the sensing blocks 50 and 70 output the differential sensing signals R12, R34, R56, and R78 having odd phases.

In this case, the synchronization of the controller 56 and the controller 76 for the first sensing may be performed by the shared clock CLK and the switching control signal SW. That is, the operations of the controller 56 and the controller 76 may be synchronized with each other by the shared clock CLK, and the start time points of the first sensing may be synchronized with each other by the switching control signal SW.

Since the switching control signal SW has start time point information of the driving signal Tx1 or the pulse output from the pulse generator 58, the controller 76 may control the sensing block 70 such that the first sensing is started at the start time point of the driving signal Tx1 or the pulse output from the pulse generator 58. Furthermore, since the controller 56 controls the pulse generation of the pulse generator 58, the controller 56 may control the sensing block 50 such that the first sensing is started at the start time point of the driving signal Tx1 or the pulse output from the pulse generator 58.

As described above, when the differential sensing signals R12 and R34 having odd phases are input to the analog to digital converter 54 of the chip 20 in response to the first sensing, the analog to digital converter 54 provides sensing data to the controller 56. Furthermore, when the differential sensing signals R56 and R78 having odd phases are input to the analog to digital converter 74 of the chip 22 in response to the first sensing, the analog to digital converter 74 provides sensing data to the controller 76.

The controller 56 of the chip 20 transfers sensing data of its own area to the controller 76 of the chip 22, and the controller 76 collects sensing data of its own area and the sensing data transferred from the controller 56.

Subsequent to the first sensing, the second driving pulses Tx1*b* may be provided to the first driving line, and at the time point at which the second driving pulses Tx1*b* are provided to the first driving line, the sensing block 50 of the chip 20 enters a state for the second sensing by the controller 56, so that the switching states of the switches S1 to S8 are controlled as illustrated in FIG. 3, and the sensing block 70 of the chip 22 also enters a state for the second sensing by the controller 76, so that the switching states of the switches S1 to S8 are controlled as illustrated in FIG. 3. The switches S1 to S8 of the sensing blocks 50 and 70 are switched to the states as illustrated in FIG. 3, so that the differential amplifiers 30 and 32 of the sensing blocks 50 and 70 output the differential sensing signals R23, R45, R67, and R89 having even phases.

In this case, since the synchronization of the controller 56 and the controller 76 for the second sensing may be performed similarly to the first sensing, a detailed description thereof will be omitted in order to avoid redundancy.

As described above, when the differential sensing signals R23 and R45 having even phases are input to the analog to digital converter 54 of the chip 20 in response to the second sensing, the analog to digital converter 54 provides sensing data to the controller 56. Furthermore, when the differential sensing signals R67 and R89 having even phases are input to the analog to digital converter 74 of the chip 22 in response to the second sensing, the analog to digital converter 74 provides sensing data to the controller 76.

The controller 56 of the chip 20 transfers sensing data of its own area to the controller 76 of the chip 22, and the controller 76 collects sensing data of its own area and the sensing data transferred from the controller 56.

As described above, when the first sensing and the second sensing are performed for each driving line, the controller 76 of the chip 22 can ensure sensing data for one frame of the touchscreen panel 10. Then, the controller 76 of the chip 22 can perform touch recognition by using the sensing data of one frame, and derive a coordinate value corresponding to touch.

Figure 10:
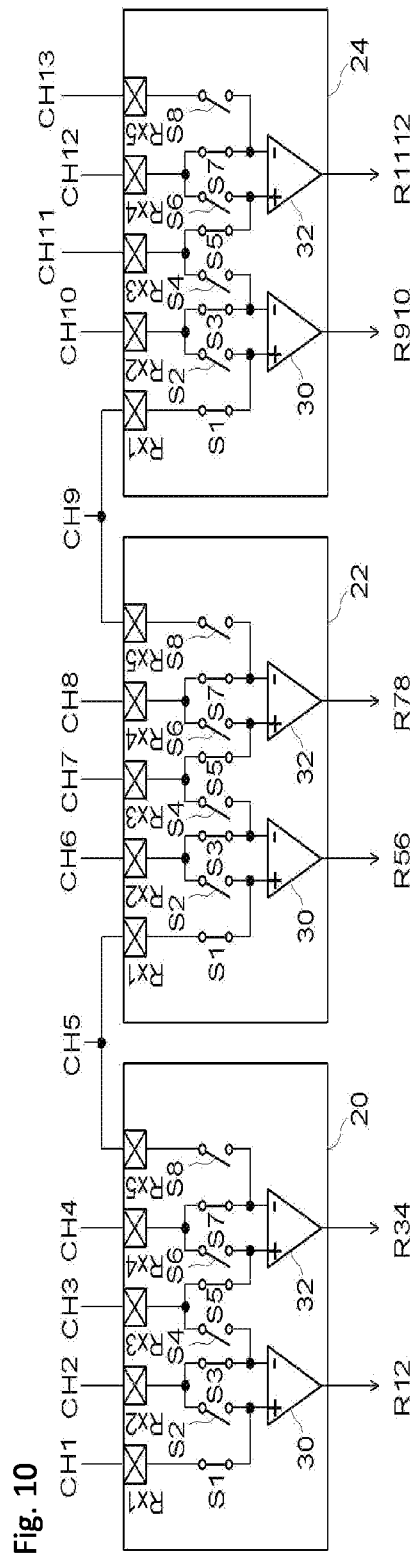
FIG. 10 is a circuit diagram illustrating another embodiment of a touch system of the present invention and illustrating a first sensing state.
Figure 11:
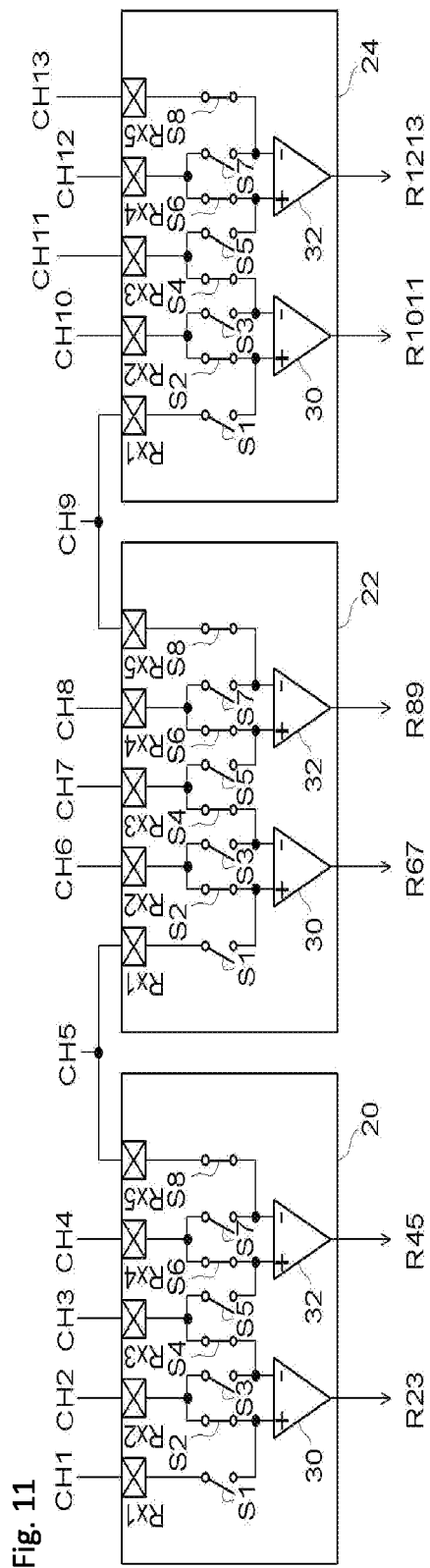
FIG. 11 is a circuit diagram illustrating a second sensing state of another embodiment of FIG. 10.
Figure 12:
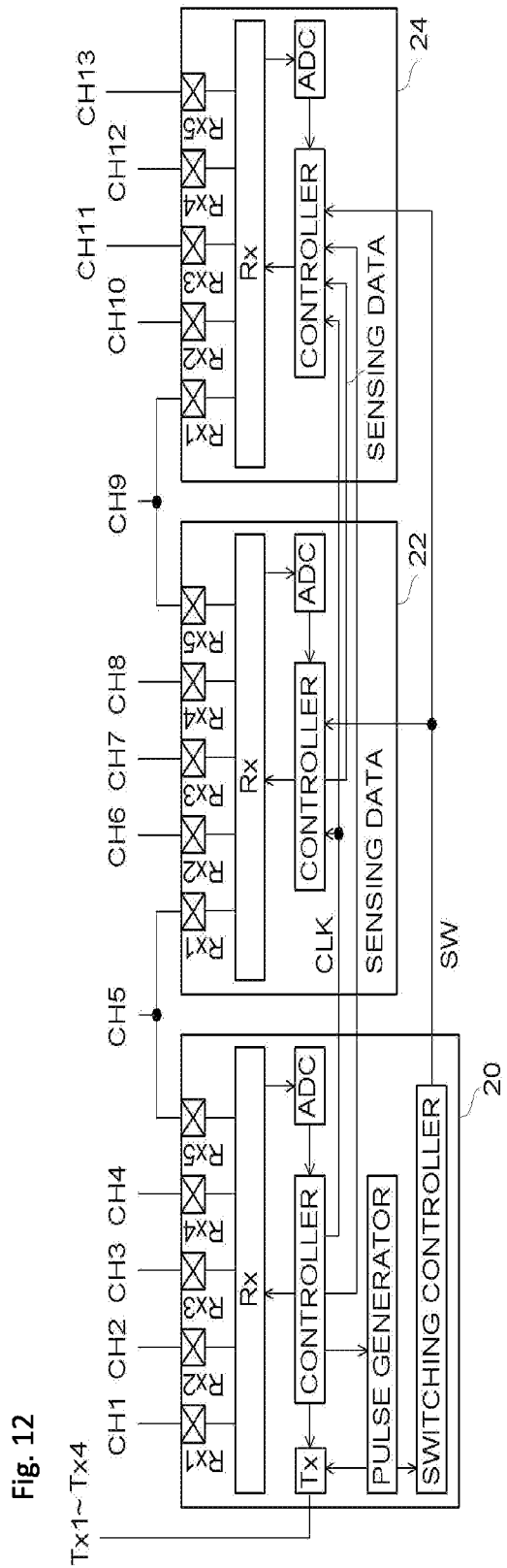
FIG. 12 is a detailed block diagram corresponding to an embodiment of FIG. 10.

In the embodiments of the present invention, two chips are provided in the touchscreen panel 10; however, three or more chips can be provided according to necessity. FIG. 10 to FIG. 12 illustrate that three chips 20, 22, and 24 are provided, wherein FIG. 10 illustrates a switching state for the first sensing, FIG. 11 illustrates a switching state for the second sensing, and FIG. 12 illustrates a configuration for synchronization among the chips.

Since the configurations of the chips 20, 22, and 24 of FIG. 10 to FIG. 12 can be understood with reference to the descriptions of the previous embodiments, the configurations and operations thereof will be omitted in order to avoid redundancy.

However, the difference exists in that in the chip 22 of FIG. 10 to FIG. 12, boundary areas may be set at both sides of an area assigned to the chip 22 and sensing lines of both sides of the boundary areas are shared by the other chips 20 and 24.

In the case of the first sensing, the chip 22 performs differential amplification using the sensing signal CH5 of the sensing line of the boundary area to output differential sensing signals R56 and R78 having odd phases, the chip 24 performs differential amplification using the sensing signal CH9 of the sensing line of the boundary area to output differential sensing signals R910 and R1112 having odd phases, and the chip 20 performs differential amplification except for the sensing signal CH5 of the sensing line of the boundary area to output differential sensing signals R12 and R34 having odd phases.

In the case of the second sensing, the chip 24 performs differential amplification except for the sensing signal CH9 of the sensing line of the boundary area to output differential sensing signals R1011 and R1213 having even phases, the chip 20 performs differential amplification using the sensing signal CH5 of the sensing line of the boundary area to output differential sensing signals R23 and R45 having even phases, and the chip 22 performs differential amplification using the sensing signal CH9 of the sensing line of the boundary area to output differential sensing signals R67 and R89 having even phases.

Accordingly, as described above, according to the embodiments of the present invention, it is possible to drive and sense the touchscreen panel having a large screen by using two or more chips, and the sensing signal of the sensing line of the boundary area is selectively used for the differential amplification of adjacent chips with respect to the first sensing and the second sensing, so that inter-chip interference can be avoided. Consequently, it is possible to remove due to the inter-chip interference, thereby facilitating data processing for the sensing signal of the sensing line of the boundary area.

While various embodiments have been described above, it will be understood to those skilled in the art that the embodiments described are by way of example only. Accordingly, the disclosure described herein should not be limited based on the described embodiments.

What is claimed is:

1. A touch system comprising:
a plurality of chips connected to sensing lines of a plurality of areas of a touchscreen panel divided into the plurality of areas and a boundary area among the plurality of areas,
wherein the chips corresponding to adjacent areas share the sensing line of the boundary area among the adjacent areas, and
the plurality of chips differentially amplify sensing signals of the adjacent sensing lines included in the areas, which correspond to the plurality of chips, and the boundary area adjacent to the areas,
wherein each of the chips performs first sensing that differentially amplifies sensing signals of sensing lines in even sequences and sensing signals of sensing lines adjacent to one side of the sensing lines in even sequences for one direction of the touchscreen panel, and second sensing that differentially amplifies the sensing signals of the sensing lines in even sequences and sensing signals of sensing lines adjacent to the other side of the sensing lines in even sequences.

2. The touch system according to claim 1, wherein the areas of the touchscreen panel are divided about the boundary area, and the boundary area includes one sensing line.

3. The touch system according to claim 1, wherein the chips corresponding to the adjacent areas include pads for a connection to the sensing line of the boundary area, and the sensing line of the boundary area is connected to the pads of the plurality of chips corresponding to adjacent areas through an interconnection branched from an exterior of the plurality of chips.

4. The touch system according to claim 1, wherein, among the chips corresponding to the adjacent areas, one chip includes one connection pad for a connection to the sensing line of the boundary area and two output pads for outputting the sensing signal of the sensing line of the boundary area, and the sensing signal of the sensing line of the boundary area is routed to the one chip through the connection pad and one output pad or is routed to a remaining chip through the connection pad and a remaining output pad.

5. The touch system according to claim 4, wherein, among the chips corresponding to the adjacent areas, the one chip includes a first switch that switches a connection between the connection pad and the one output pad and a second switch that switches a connection between the connection pad and the remaining output pad, and the first switch and the second switch are switched in a contrary manner.

6. The touch system according to claim 1, wherein, among the chips corresponding to the adjacent areas, one chip uses a sensing signal of the sensing line of the boundary area in response to the first sensing, and a remaining chip uses the sensing signal of the sensing line of the boundary area in response to the second sensing.

7. The touch system according to claim 1, wherein each of the chips comprises:
a pad unit including a plurality of pads for receiving the sensing signals of the sensing lines included in the areas, which correspond to the plurality of chips, and the boundary area adjacent to the areas;
a differential amplification circuit that has a first input terminal and a second input terminal and includes a plurality of differential amplifiers that differentially amplify the sensing signals that are input to the first input terminal and the second input terminal; and
a switching circuit that matches three pads, which receive sensing signals of sensing lines in even sequences and sensing signals of sensing lines adjacent to both sides of the sensing lines in even sequences for one direction of the touchscreen panel, to each differential amplifier for switching, selectively connects a first pad and a second pad, which receive the sensing signals of the sensing lines in even sequences and sensing signals of sensing lines adjacent to one side of the sensing lines in even sequences, to the first input terminal, and selectively connects the second pad and a third pad, which receive the sensing signals of the sensing lines in even sequences and sensing signals of sensing lines adjacent to the other side of the sensing lines in even sequences, to the second input terminal.

8. The touch system according to claim 7, wherein the switching circuit includes a first switch between the first pad and the first input terminal and a second switch between the second pad and the first input terminal in order to selectively connect the first pad and the second pad to the first input terminal, and includes a third switch between the second pad and the second input terminal and a fourth switch between the third pad and the second input terminal in order to selectively connect the second pad and the third pad to the second input terminal, wherein turn-on states of the first switch and the third switch are contrary to turn-on states of the second switch and the fourth switch.

9. The touch system according to claim 7, wherein the switching circuit performs sequential switching for first sensing and second sensing, connects the first pad to the first input terminal while connecting the second pad to the second input terminal in response to the first sensing, and connects the second pad to the first input terminal while connecting the third pad to the second input terminal in response to the second sensing.

10. The touch system according to claim 1, wherein, among the plurality of chips, at least one chip receives sensing data corresponding to sensing signals of other chips of the plurality of chips, and recognizes touch by using sensing data of the at least one chip and the sensing data of the other chips.

11. The touch system according to claim 10, wherein each of the chips performs, for each driving line, first sensing that differentially amplifies sensing signals of sensing lines in even sequences and sensing signals of sensing lines adjacent to one side of the sensing lines in even sequences for one direction of the touchscreen panel, and second sensing that differentially amplifies the sensing signals of the sensing lines in even sequences and sensing signals of sensing lines adjacent to the other side of the sensing lines in even sequences, wherein the at least one chip provides a control signal for synchronization of the first sensing and the second sensing to the other chips.

12. The touch system according to claim 11, wherein the first chip generates the control signal in synchronization with any one of the driving signal and a pulse for generating the driving signal.

13. The touch system according to claim 1, wherein, among the chips, a first chip performs a process of providing driving signals to the touchscreen panel, receiving sensing data corresponding to the sensing signals of other chips, and recognizing touch by using the sensing data of the first chip and the other chips.

14. A touch system comprising:
- a pad unit including a plurality of pads for receiving sensing signals of sensing lines included in a plurality of areas and a boundary area among the plurality of areas of a touchscreen panel, the plurality of areas corresponding to the plurality of pads, the pads receiving the sensing signal of the sensing line of the boundary area and sharing the sensing signal with the pads of another chip;
- a differential amplification circuit that has a first input terminal and a second input terminal and includes a plurality of differential amplifiers that differentially amplify the sensing signals that are input to the first input terminal and the second input terminal; and
- a switching circuit that matches three pads, which receive sensing signals of sensing lines in even sequences and sensing signals of sensing lines adjacent to both sides of the sensing lines in even sequences for one direction of the touchscreen panel, to each differential amplifier for switching, selectively connects a first pad and a second pad, which receive the sensing signals of the sensing lines in even sequences and sensing signals of sensing lines adjacent to one side of the sensing lines in even sequences, to the first input terminal, and selectively connects the second pad and a third pad, which receive the sensing signals of the sensing lines in even sequences and sensing signals of sensing lines adjacent to the other side of the sensing lines in even sequences, to the second input terminal.

15. The touch system according to claim 14, further comprising:
- a connection pad for a connection to the sensing line of the boundary area; and
- two output pads that outputs the sensing signal of the sensing line of the boundary area,
- wherein between the two output pads, one output pad is connected to a first specific pad of the pad unit in order to share the sensing signal, and the other output pad is connected to a second specific pad of the pad unit of the other chip, and the connection pad is connected to any one of the two output pads through switching.

16. The touch system according to claim 15, wherein the connection pad and the one output pad are connected to each other by an external first switch, the connection pad and the other output pad are connected to each other by an external second switch, and the first switch and the second switch are switched in a contrary manner.

17. The touch system according to claim 14, further comprising:
- a sensing block including the differential amplification circuit and the switching circuit;
- an analog to digital converter that converts a differential amplification signal of the differential amplification circuit of the sensing block into sensing data; and
- a controller that controls switching of the sensing block for first sensing that differentially amplifies the sensing signals of the sensing lines in even sequences and the sensing signals of the sensing lines adjacent to one side of the sensing lines in even sequences, and second sensing that differentially amplifies the sensing signals of the sensing lines in even sequences and the sensing signals of the sensing lines adjacent to the other side of the sensing lines in even sequences.

18. The touch system according to claim 17, further comprising:
- a driving block that outputs driving signals to driving lines of the touchscreen panel;
- a pulse generator that provides a pulse for generating the driving signals under control of the controller; and
- a switching controller that generates a switching control signal for switching of the sensing block in synchronization with any one of the driving signal and the pulse, and provides the switching control signal to other chips.

19. The touch system according to claim 17, wherein the controller transfers the sensing data of the analog to digital converter to other chips, and performs touch recognizes by using sensing data transferred from the other chips and the sensing data of the analog to digital converter.

20. The touch system according to claim 17, wherein the controller performs an operation synchronized among chips by sharing of the clock signal, which transfers a clock signal of the controller to other chips or receives a clock signal of the other chips.

21. A control method of a touch system, comprising:
- providing, by a driving block of a first chip of a plurality of chips corresponding to a touchscreen panel, a driving signal for first sensing and second sensing to each driving line;
- selecting, by sensing blocks of the plurality of chips, sensing signals of sensing lines in even sequences and sensing signals corresponding to sensing lines adjacent to one side of the sensing lines in even sequences among sensing lines arranged in one direction, which are included in areas corresponding to the sensing blocks and a boundary area adjacent to the areas, in response to the driving signal for the first sensing and outputting a first differential amplification signal having an odd phase; and
- selecting, by the sensing blocks of the plurality of chips, the sensing signals of the sensing lines in even sequences and sensing signals corresponding to sensing lines adjacent to the other side of the sensing lines in even sequences, which are included in the areas corresponding to the sensing blocks and the boundary area adjacent to the areas, in response to the driving signal for the second sensing and outputting a second differential amplification signal having an even phase.

22. The control method of a touch system according to claim 21, wherein the driving signal includes first driving pulses for the first sensing and second driving pulses for the second sensing, which are sequentially output to a same driving line.

23. The control method of a touch system according to claim 21, further comprising:
- transmitting, by controllers of other chips except for a second chip of the plurality of chips, sensing data corresponding to a differential sensing signal to a controller of the second chip; and
- performing, by the controller of the second chip, a process of collecting sensing data of an area of the controller of the second chip and sensing data transferred from controllers of other chips, performing touch recognition, and driving a coordinate value.

* * * * *